(No Model.)

J. R. PARSONS & H. H. WELCH.
VEHICLE.

No. 352,981. Patented Nov. 23, 1886.

WITNESSES
C. Bendixon
A. F. Walz

INVENTORS:
John R. Parsons
Horace H. Welch

UNITED STATES PATENT OFFICE.

JOHN R. PARSONS AND HORACE H. WELCH, OF EARLVILLE, NEW YORK.

VEHICLE.

SPECIFICATION forming part of Letters Patent No. 352,981, dated November 23, 1886

Application filed June 10, 1886. Serial No. 204,697. (No model.)

*To all whom it may concern:*

Be it known that we, JOHN R. PARSONS and HORACE H. WELCH, of Earlville, in the counties of Chenango and Madison, respectively, in the State of New York, have invented new and useful Improvements in Vehicles, of which the following, taken in connection with the accompanying drawings, is a full, clear, and exact description.

This invention consists in a novel and simple construction of a four-wheeled vehicle carrying its body below the hind axle and head-block, so as to be convenient of access for loading and unloading and more secure against upsetting, as hereinafter fully described, and specifically set forth in the claims.

Figure 1:
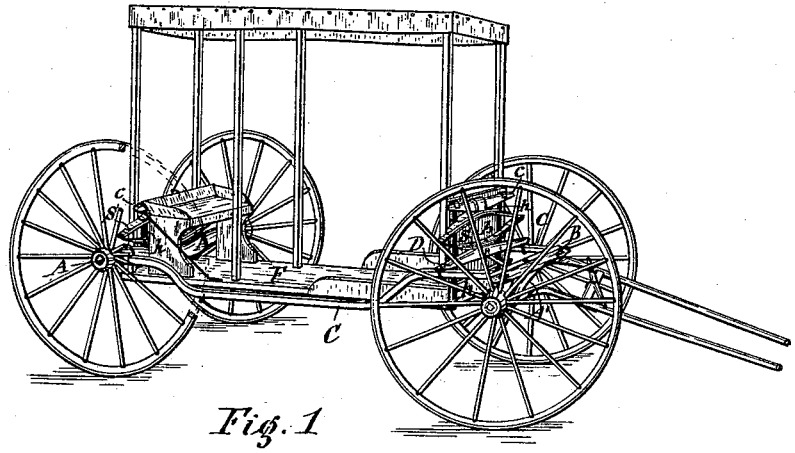
Figure 2:
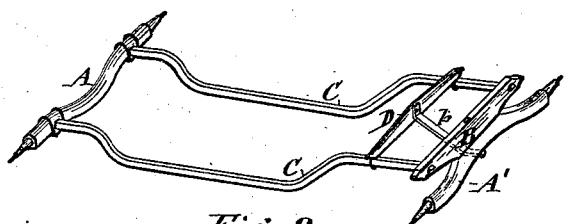

The invention is fully illustrated in the annexed drawings, wherein Figure 1 is a perspective view of our improved vehicle, and Fig. 2 is a perspective view of the running-gear bare of the wheels and body.

Similar letters of reference indicate corresponding parts.

A and A' represent, respectively, the rear and forward axles of the vehicle.

B denotes the head-block, pivoted on top of the forward axle by the king-bolt in the usual manner.

C C represent two reaches, which are connected to the ends of the rear axle and ends of the head-block in any suitable and well-known manner. These reaches have their forward end portions extended horizontally from the head-block part way rearward, so as to maintain said portions of the reaches at a proper elevation for a sufficient distance from the head-block to allow the forward wheels the requisite play for cramping or turning the forward axle on the king-bolt. The central or main portions of the reaches are deflected downward, as shown, for the purpose hereinafter explained.

Across the top of the forward end portions of the two reaches, some distance back of the head-block, is secured a cross-bar, D, and by a brace, $b$, extended from the said cross-bar to the lower end of the king-bolt and coupled to the latter, said king-bolt is sustained in a vertical position.

Upon the cross-bar D and rear axle, A, are mounted the springs S S, which may be of any suitable style. When of elliptic form, as represented in the annexed drawings, a bar, $c$, is secured to the top of each spring lengthwise thereof, and from the said bars is suspended the body F by means of hangers $h\ h$, of sufficient lengths to carry the body below the head-block and rear axle, as shown in Fig. 1 of the drawings, the two reaches being a sufficient distance apart to receive the body F between them, and the depression of the central or main portions of the reaches renders the low-hanging body easy of access for loading and unloading the vehicle. Aside from these advantages it will also be observed that a vehicle constructed in accordance with our invention is more secure against upsetting than ordinary vehicles.

Having described our invention, what we claim as new, and desire to secure by Letters Patent, is—

1. In a four-wheeled vehicle, the combination, with the hind axle and head-block, of two reaches having the central or main portions of their lengths deflected downward, and the body carried between said reaches and below the hind axle and head-block, substantially as described and shown.

2. The combination, with the hind axle and head-block, of two reaches connected to the ends of said parts, and extending horizontally from the head-block part way rearward, and having their central portions deflected downward, a cross-bar secured to the reaches back of the head-block, and the body hung below and between the said cross-bar and hind axle, substantially as described and shown.

3. The combination, with the hind axle and head-block, of two reaches connected to the ends of said parts and extending horizontally from the head-block part way rearward, and having their central portions deflected downward, a cross-bar secured to the reaches back of the head-block, a brace extending from the lower end of the king-bolt to the aforesaid cross-bar, springs mounted on the cross-bar and hind axle, and the body supported by said springs and carried below the aforesaid cross-bar and hind axle, all constructed and combined substantially as described and shown.

In testimony whereof we have hereunto signed our names and affixed our seals, in the presence of two attesting witnesses, at Earlville, in the county of Madison, in the State of New York, this 26th day of May, 1886.

JOHN R. PARSONS. [L. S.]
H. H. WELCH. [L. S.]

Witnesses:
WHITMAN CLARKE,
F. E. CLARKE.